(12) United States Patent
Da Costa Duarte Pardal et al.

(10) Patent No.: US 8,247,912 B2
(45) Date of Patent: Aug. 21, 2012

(54) ATMOSPHERIC RESOURCES EXPLORER

(75) Inventors: Tiago Da Costa Duarte Pardal, Lisbon (PT); Marco Aurelio Baptista De Almeida Freire, Voorhout (NL)

(73) Assignee: Omnidea, Lda., Viseu (PT)

( * ) Notice: Subject to any disclaimer, the term of this patent is extended or adjusted under 35 U.S.C. 154(b) by 382 days.

(21) Appl. No.: 12/302,435

(22) PCT Filed: May 31, 2007

(86) PCT No.: PCT/PT2007/000022
§ 371 (c)(1),
(2), (4) Date: Nov. 25, 2008

(87) PCT Pub. No.: WO2007/139412
PCT Pub. Date: Dec. 6, 2007

(65) Prior Publication Data
US 2009/0278353 A1 Nov. 12, 2009

(30) Foreign Application Priority Data

May 31, 2006 (PT) .......................................... 103489

(51) Int. Cl.
*F03D 9/00* (2006.01)
(52) U.S. Cl. ............................................. 290/44; 290/55
(58) Field of Classification Search .................... 290/44, 290/55
See application file for complete search history.

(56) References Cited

U.S. PATENT DOCUMENTS

| | | | | |
|---|---|---|---|---|
| 4,073,516 A * | 2/1978 | Kling | .............................. | 290/55 |
| 4,084,102 A * | 4/1978 | Fry et al. | .......................... | 290/55 |
| 4,124,182 A * | 11/1978 | Loeb | ........................... | 244/153 R |
| 4,659,940 A * | 4/1987 | Shepard | ........................... | 290/55 |
| 6,498,402 B2 * | 12/2002 | Saiz | ................................ | 290/55 |
| 6,523,781 B2 * | 2/2003 | Ragner | ...................... | 244/153 R |
| 7,188,808 B1 * | 3/2007 | Olson | ........................ | 244/153 R |
| 2006/0251505 A1 * | 11/2006 | Ferguson | ........................ | 415/4.1 |
| 2007/0126241 A1 * | 6/2007 | Olson | ............................. | 290/55 |
| 2007/0176432 A1 * | 8/2007 | Rolt | ................................ | 290/55 |

FOREIGN PATENT DOCUMENTS

| | | |
|---|---|---|
| FR | 2 475 148 A1 | 8/1981 |
| NL | 1017171 C1 | 7/2002 |
| WO | 80/01705 A1 | 8/1980 |

* cited by examiner

*Primary Examiner* — Quyen Leung
*Assistant Examiner* — Naishadh Desai
(74) *Attorney, Agent, or Firm* — Sughrue Mion, PLLC

(57) ABSTRACT

The invention herein described consists of a system destined to harness wind resources, transferring wind power to the ground station group on the surface, the process being performed through the tensioning and unwinding of the cable group connecting the airborne group to a reeler in the said ground station group. Through the control group the resultant force vector of the aerodynamic forces tensioning the cable can be significantly altered. This change in aerodynamic forces can be done in order to create two different phases which define the cyclic movement performed by the system: a work phase, where the resultant force vector is of greater magnitude and tensions the cable, unwinding it at the ground station group and thus producing power; and a recovery phase (which requires power from the system) when the cable is rewound in order to bring the airborne group back to its original position. Because the work produced in the work phase is of greater magnitude than the work required during the recovery phase, the system generates positive net power, which can then be introduced in the electrical grid, or stored as any other form of energy such as chemical or mechanical.

11 Claims, 9 Drawing Sheets

Figure 1:
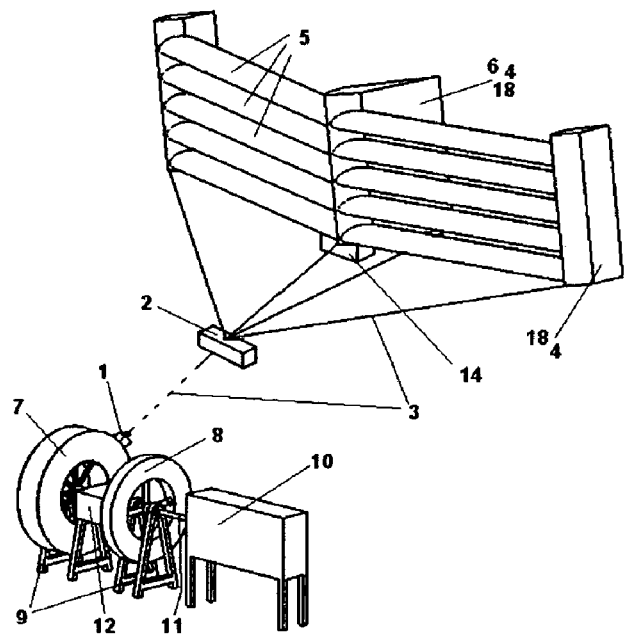

Figure 9　　　　　Figure 10
  
Figure 11　　　Figure 12
Figure 13
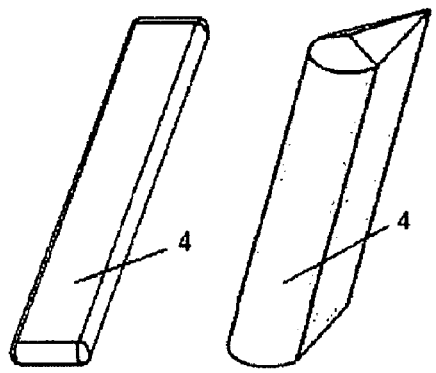
Figure 14　　Figure 15
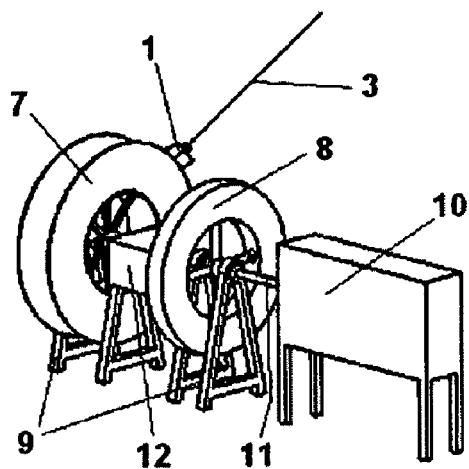
Figure 16

ATMOSPHERIC RESOURCES EXPLORER

INVENTION SCOPE & BACKGROUND

Renewable Energy Sources (RES), despite their clear advantages over fossil fuel derived energy, are still a relatively small proportion of the total energy used. Furthermore, they are usually far more expensive then their comparable fossil counterparts, in a cost per kWh base. Hence it is fair to say that RES still need considerable development efforts if they are to become a viable and applicable alternative to energy derived from fossil fuel.

In order to fulfill these goals, one should not only consider currently available developed technologies, based on a concept dating back to medieval wind mills in the case of energy production through wind power utilization, but also strive forward with radically new ways of harnessing the wind's energy, which is the intention of this invention.

In the case of harnessing wind power, this problem is further enlarged due to the currently used philosophy of power production: operating essentially as wind mills of the past, the latest generation of turbines continues to explore wind at very low altitudes. It is known that wind speeds (and its power density) increase with altitude, although this relationship is not linear. If we continue to operate at low altitudes, we are forced to see wind energy as an essentially scarce resource, offering energy densities per unit of area inferior to those of solar power. In this case in order to be cost competitive we would need to maximize the efficiency of the current wind turbines. This efficiency maximization can be very expensive, yielding a cost per unit of power produced higher than other competitive energy forms.

The present invention, developed in the field of mechanical engineering, proposes a different approach to wind energy conversion and to the harness of wind power, with a clear focus on decreasing the inherent costs of this energy source. Instead of maximizing the efficiency of currently available wind turbines, a system is conceived where the cost per unit of power output from wind power is not only much lower, but also far less dependent upon the conversion efficiency of the system, when compared with wind turbines.

It is also considered that the present system can solve the open question of high altitude platforms, which has not yet seen the desired technological breakthrough. All solutions proposed so far are always short on the energy supply system, due essentially to the storage issue. This shortage hinders the platform's ability to remain airborne for considerable periods of time, in the case of heavier than air systems (aircrafts or airplanes), but also poses major problems for lighter-than-air crafts (e.g. aerostats and balloons) since the energy requirements for allowing control are usually above the energy storage capacity installed. In this latter case the lighter-than-air crafts will not have sufficient power for pitch and attack angle control, frequently being adrift in the wind, in situations where the drag can become unsustainable. With respect to airplanes, attempts have been made to use solar power as an energy source, but night time operation remains a major unsolved problem. Wind power, available also during night periods, provides a more interesting and viable option.

Cited Documents:

| | | |
|---|---|---|
| 3,924,827 A | - December 1975 - Lois | United States |
| 4,076,190 A | - February 1978 - Lois | United States |
| 4,251,040 A | - February 1981 - Loyd | United States |
| 6,072,245 A | - June 2000 - Ockels | United States |
| 6,254,034 B1 | - July 2001 - Carpenter | United States |
| 6,523,781 B2 | - February 2003 - Ragner | United States |

PRIOR ART

The Lois patent (1975-U.S. Pat. No. 3,924,827 A) laid out the fundamentals of the concept of extracting power from medium altitude winds (100 m to 400 m), without the need for a rigid support connected to the ground; its concept includes pressurized lighter-than-air bodies able to convert wind energy into mechanical work which can be harnessed at a ground base.

Despite its ground breaking status, this patent was still missing a core principle: aerodynamic forces such as lift and thrust were not identified and hence the body worked mainly on drag. Also the means to control such a mechanism were, in our opinion, not fully developed in 1975. An example can be traced to the possibility (apparent in the text) of changing the aerodynamic attitude of the foil, but no mention is made to the craft's control under strong gust winds or the possibility of adverse weather conditions. Another fundamental difference relates to the fact that this system does not operate according to a cycle, i.e. there's no positive work phase (cable pulling) and negative work phase (cable recovery, for which work must be supplied to the system).

The $2^{nd}$ Lois patent (1978-U.S. Pat. No. 4,076,190 A) is basically an improvement upon the first Lloyd patent filed (1975). It is still aimed at harnessing energy from wind speeds at medium altitude, and it still does so through a buoyant wing airfoil. The main improvement concerns the addition of a device capable of sensing the wind velocity gradient and elevating (or lowering) the airfoil correspondingly. It maintains the working configuration of the first patent version and adds clear remarks that the energy to be harnessed comes clearly from drag. Nevertheless all of the above mentioned problems remain unsolved.

Loyd's Patent (1981-U.S. Pat. No. 4,251,040 A) is a clear evolution from Lois initial patent, since it uses a device, on the extremity of a tether cable which is capable of harnessing energy contained in wind from both drag and lift. Hence an aerodynamic similarity with the applicant's concept exists since in this patent lift is mentioned. Other relevant features include the cable connection system to the ground station which produces electrical power. Nevertheless the similarities end here, as:

The aerodynamic shape used to produce airborne mechanical power is not of the same nature as the applicants, since it does not convert the flux of linear momentum into lift on a shape which will pull a cable. Instead the lift is used to generate airborne mechanical power (directly) which is then transferred to the ground system;

Loyd's invention is clearly of the "permanent" production type, since the airborne group travels in a radius from the ground point and produces power during the entire operating period, meaning that no negative work phase exists.

Ockels patent (2000-U.S. Pat. No. 6,072,245 A) is the first to integrate two fundamental concepts that have previously been introduced by Lois (1975) and Loyd (1981): possible tethered lighter-than-air forms transform wind energy into mechanical energy which can be converted, in the ground, to electrical energy (Lois, 1975) and the use of lift as the dominant form for the harnessing of the wind power. But, its operating process is entirely different than the one envisaged by the applicant:

Ockels device is permanently generating power, as the energy required to recover the airfoils executing the downward path is being instantly drained from the power produced by the airfoils, which are being lifted in the other half of the ladder mill;

In Ockels patent, the airfoils move only in the radial direction (upwind and downwind) not being able to move freely to cope with, for example, winds blowing in different directions (this is only allowed by the rotating ability of the ground station platform). While in the present applicants invention the airfoil is constrained only by the cable attaching it to the ground and, hence, it is free to move airborne in any direction;

Ockels patent, as is currently envisaged, poses steep design and control difficulties; the control operations being much more than just controlling the angle of attack, as the loop cycle must be performed no matter the wind conditions (direction and speed). Thus it is possible that Ockels design ends up at a higher cost per kWh of energy produced than the current state-of-the-art vertical turbines;

Ockels design cannot easily be used as a stratospheric platform; the apparatus shape, at the top of part of the ladder mill, changes constantly, as the airfoils perform their movement, being driven upwards and downwards and preventing the apparatus from having a clear and constant shape at its maximum height level.

Carpenter's patent (2001-U.S. Pat. No. 6,254,034 B1), which draws upon his own 1996 and 1999 patents, shows no major evolution. Despite making use of a tethered aircraft (as Carpenter himself calls it) and using a cycle in which the positive working phase (aircraft traveling upwards and imposing tension on a cable, or downwind as Carpenter calls it) and negative working phase (when the aircraft is reeled in) are clearly identified, he fails to identify the aerodynamic force which is pulling his craft up. Essentially he makes no distinction between work done by lift or by drag. Making no use of lift one can also point out that its power producing ability will always be limited. Furthermore, not being a lighter-than-air craft, doubts remain over operation under wind absence conditions. Hence, it is a small evolution when compared to Lois (1975) initial patent, since his only significant achievement is the fact that the energy producing sytem (as well as the control) is simpler, yielding a more favorable cost per kWh of energy produced.

Ragner's patent (2003-U.S. Pat. No. 6,523,781 B2), links together some important concepts: he uses tethered lighter-than-air airfoil kites and transmits these forces, through line tension, to a ground station group, where they will be converted into work. It also performs a cycle with an initial phase that produces positive work, followed by a negative work phase in which the kite is reeled back to its initial position. Up to this point Ragner's design presents many similarities with the applicant's design. Nevertheless both patents differ substantially in some basic and fundamental concepts, as well as procedures:

According to Ragner himself, and quoting pag 5. of his description: " . . . The applicant's design (Ragner's patent) in contrast (to Ockels' patent) uses an airfoil surface that points its leading edge substantially perpendicular to the wind, creating useful force in the general direction of the wind, not perpendicular to it." This shows a major concept difference between our concept and Ragner's patent. In our case the leading edge of the airfoil is essentially parallel to the wind's direction (the difference being the small attack angle) and the airfoils' movement, which produces power, is essentially perpendicular to the wind direction.

Ragner's concept is intended to work mainly horizontally or, in other words, parallel to the ground (more precisely at an angle of θ=30°, as mentioned a few times by Ragner in his patent), while the applicant's concept is essentially working vertically to the ground. This implies that, in order to collect the high speed winds from high altitudes, the length of the cables, in Ragner's concept, will be substantial, preventing its use from most of the locations of interest.

Another difference comes from the use of a different type of airborne structure which employs balloons on the airborne group for both buoyancy reasons and aerodynamic stability reasons; this is non-existent in Ragner's design.

A further differentiating characteristic emanates from the movement performed by Ragner's airfoils. His airfoils are small in area and travel at great speeds, while the applicant's concept follows a different philosophy, opting for lower speeds and larger wing areas. It must be noted that long cables traveling at high speeds close to the ground, pose a major concern in terms of safety and security.

DRAWINGS DESCRIPTION

In FIG. 1 a possible layout of the system is presented, where a control box (2) with actuators for the control group are shown, as well as cabling equipment (3), belonging to the cable group, which is being directed either during the unwinding or rewinding phase to the reeler (7), by a roller fairlead component (1) (such as the ones used in winches), or another cabling guiding device. The cabling harness not only performs the connection between different components of the airborne group but also links this group to the ground station group. A clutch apparatus (12) is responsible for the transmission (or its absence) of movement to the remaining elements, like the installed inertia wheel (8), the shaft (11) that feeds the alternator (10), or a propulsion system (16) or any other system able to use torque as an input. The mountings (9) restrain the ground station group components and support the efforts transmitted into them. The airborne group is also composed of inflated elements from the buoyancy system (4), a central element with a center of pressure back enough from the leading edge as to ensure natural aerodynamic stability to the airborne group when subject to an air flux and stabilizing tails (6) designed to perform similar tasks to the central element and also part of the control group. The inflated elements of the buoyancy system (4) also perform the task for the structural system since they are attached to, and provide support for, the aerodynamic system (5) responsible for the provision of lift. All the equipments, which might be used in order to accomplish functions other than the Atmospheric Resources Explorer main functions, are placed in the payload system (14) which, in this example, is located underneath the structural part of the airborne group.

Figure 2:
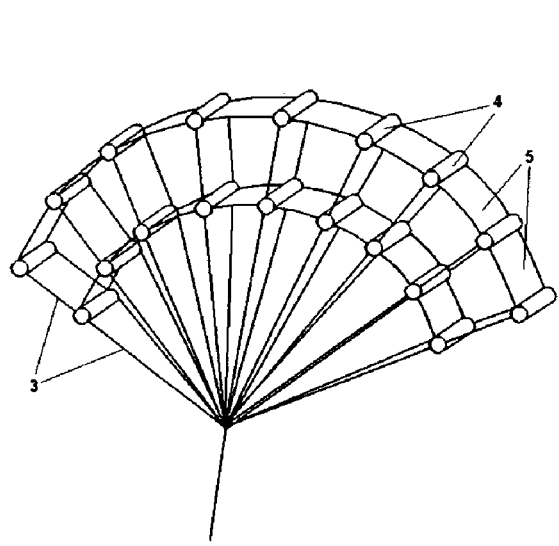

FIG. 2 shows, another possible configuration for the airborne group of systems. Components are numbered in much the same way as they were in FIG. 1, for ease of identification purposes. This wind power harnessing device has the ability to, in agreement with the occasional requirements, be modular. This is to increase the power output, being able to, in its final form, present dimensions as large as needed, to achieve the desired output. Enlargement is possible in all directions.

In FIG. 2 a typical example of this modularity is shown, identifying the pattern developed and realizing that the exposed area can easily be multiplied both in height and/or span.

Figure 3:
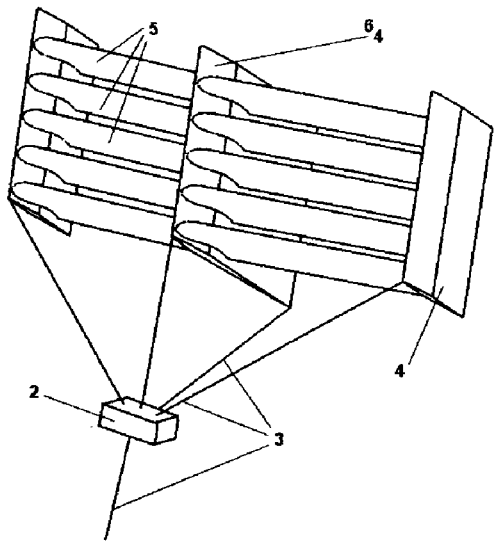
Figure 4:
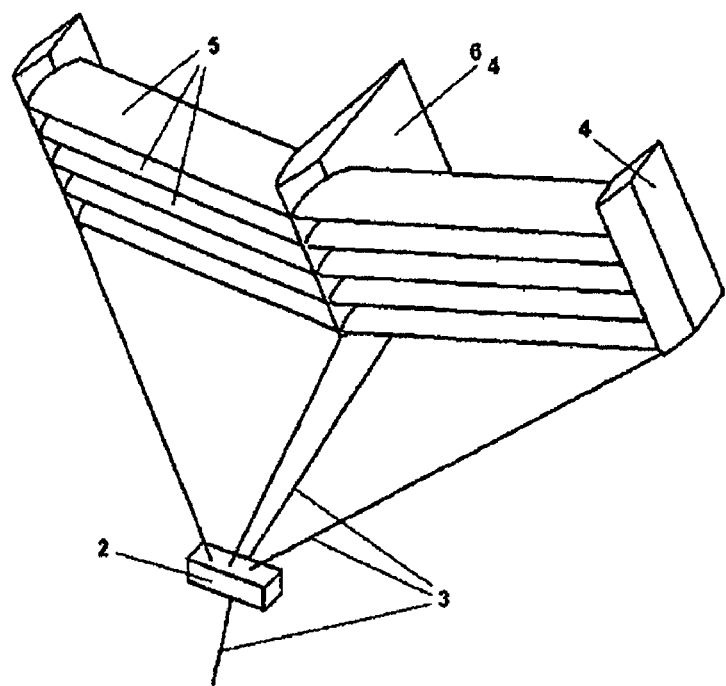

FIGS. 3 and 4 represent the orientations of, respectively, the work and recovery phases of the airborne group of systems. During the work phase the wing airfoils (5) present an attitude (angle of attack versus the incoming air flux) that is positive and inclined enough to generate lift along the area of the wing airfoils. This in turn transfers a traction force to the cable (3) and a subsequently feeds mechanical power to, for example, a shaft (11) in the ground station group (not present in this figure). During recovery these same profiles present an angle of attack which differs from the one used during the working phase, guaranteeing a downward movement of the airborne group, with minimized aerodynamic opposing forces, which reduces the energy required for cable rewinding. It should be noted that during this phase the supply of energy input to the airborne group is required, hence making this phase energy consuming.

Figure 5:
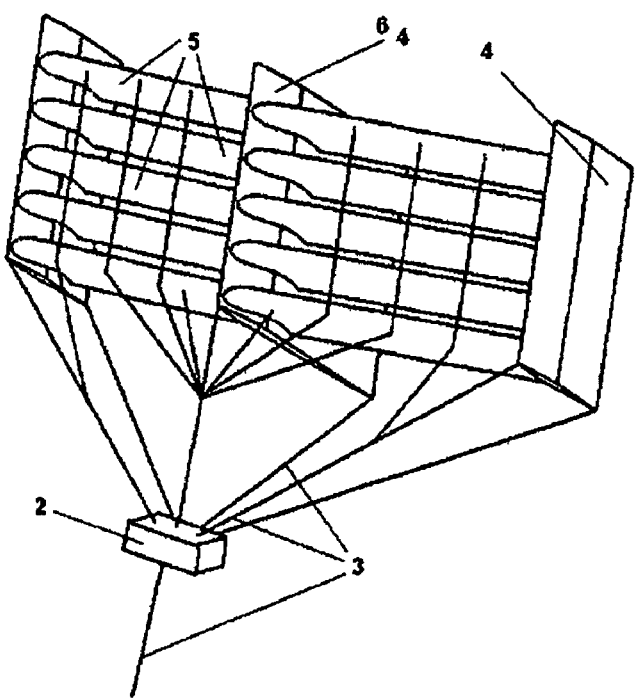

FIG. 5 demonstrates a possible cabling (3) layout able to better distribute the efforts sustained by the different components in order to prevent hazardous effects, such as cloth rupture, and also improving the normal working conditions of the system as well as its durability.

Figure 6:
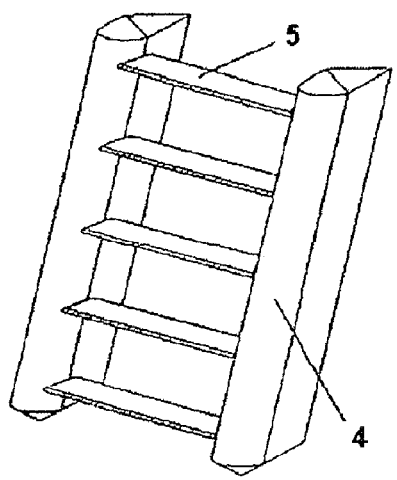

FIG. 6 exemplifies another possible arrangement for the airborne group, being a possible alternative to the drawings of FIGS. 1, 2, 3 and 4.

Figure 7:
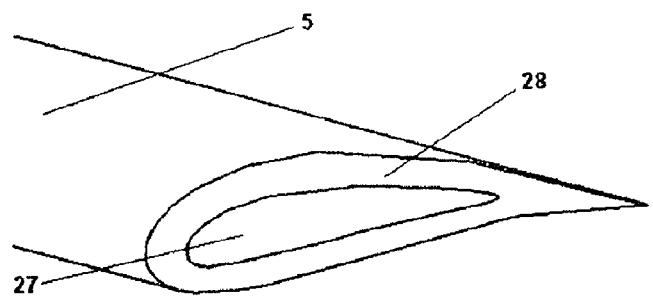

FIG. 7 displays an example of an inflated wing profile with net buoyancy (able to stay adrift without wind). It also presents the peculiarity of having two gas tight layers, an inner layer (27) inflated with any lighter-than-air gas (hydrogen, helium, methane, neon, just to mention some possibilities) and an outer layer (28) inflated with an inert gas. This further complements the safety of the overall system since the inert gas functions as a buffer and assures that the leakage of any inflammable gas (such as hydrogen) from the inner layer (27), will never be mixed with air's oxygen in a flammable proportion.

Figure 8:
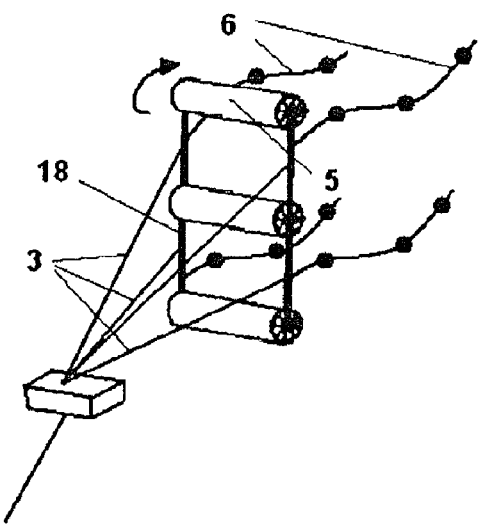

In FIG. 8 an aerodynamic system featuring cylinders of the aerodynamic system (5) is shown in which the working phase is performed through an axial rotation of these cylinders, in order to take advantage of the Magnus effect, hence obtaining increased lift and drag, with a combined summed vector which induces cable tension. During cable recovery the cylinders (5) rotate in the opposite direction inducing downforce (negative lift), or alternatively they don't rotate at all in which case only natural drag must be overcome in order to rewind the cable. The end result is that, under the action of wind forces, the resulting force acting upon the system during the work phase is much higher than that acting during recovery. The cylinders remain attached to the structural system (18) which allows them to rotate axially. This model's stability is ensured by a possible solution consisting in the application of brace cables stabilizing tails (6) in order to provide the airborne group's with natural aerodynamic stability.

FIGS. 9, 10, 11, 12 and 13 provide examples of components used in the aerodynamic system (5) to obtain the expected lift force. The components of FIGS. 9 and 12 are wing profiles designed to provide high lift to drag ratios, as are those of FIGS. 10 and 13 which, also have the ability to generate buoyancy. The component presented in FIG. 11 is a cylinder which can, through axial controlled rotation, take advantage of the Magnus effect.

FIGS. 14 and 15 show multiple examples (though these should not be considered restrictive) of possible buoyancy components. Its main goal is to render the whole airborne group adrift, even during periods of complete wind absence. In these particular drawings these components also serve to sustain the wing profiles which guarantee that lift is acting upon the system, thus being part of at least two systems: buoyancy (4) and structural (18).

FIG. 16 illustrates a possible embodiment of the ground station group, which is amongst other tasks, responsible for the rewinding of the cable during the recovery phase and the mechanical to electrical energy conversion that is periodically harnessed by the airborne group. The ground station group is, in this particular case, composed of a reeler (7) for the Cable group that feeds an alternator (10). To improve the system's performance an inertia wheel (8) may be added, as well as mounting supports (9) for the various components, a shaft (11) and a lock or clutch (12) in order to decouple the reeler (7) during the recovery phase. The flywheel (8) is one of the components of optional use, the aim being a constant energy and power transfer which is difficult to achieve without a torque smoothing device such as a flywheel. In fact this device accepts energy from the airborne group during the work phase, using it to increase its rotating speed. Afterwards, when the recovery phase begins, it acts as an energy reserve, supplying power for the recovery phase of the airborne group through a reduction in its rotating velocity. In such an arrangement the alternator is provided with power directly from the flywheel (8). But, in order to guarantee the supply of work during the recovery phase another device, that not a flywheel can be used, just as long as it is capable of storing energy. Such devices include electrochemical cells, capacitors, gas compressors, amongst other currently known devices to perform such a task. The alternator (10) is responsible for the conversion of mechanical movement into electrical energy. Nevertheless other similar devices exist that can produce the same end result (electrical energy) from the same input (mechanical power), an example being applications using magnetic-hydrodynamics. The mountings (9) can be used to maintain the reeler (7) and the flywheel (8) in a position in which the efforts supported by them pose no particular problem to the group, but also in a position that does not hamper any rotating movements that are required for the correct functioning of the ground station group.

Figure 17:
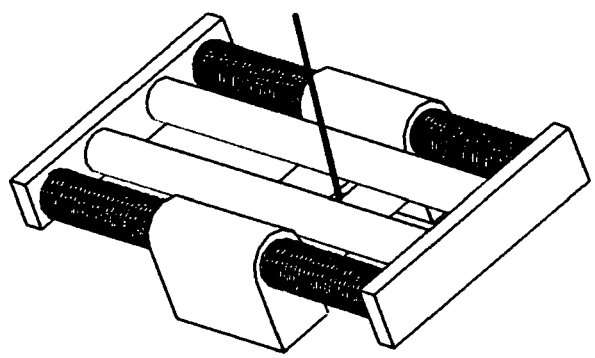

FIG. 17 represents a roller fairlead system, whose objective is to minimize friction while performing the unwinding/rewinding of the cable (3) to the reeler (7). The roller fairlead includes a mobile part destined to drive the cable in a determinate direction and with a specific pitch, through the complete width of the reeler (7), in order to maximize the length of wound cable. Or rephrasing, in this component the cable passes through the slot between the rollers, of which one pair moves back and forth guiding the cable onto the reeler (7). The cable may (or not) slide over the two horizontal shafts depending on the angle of incidence at which it is arriving at this guiding system.

Figure 18:
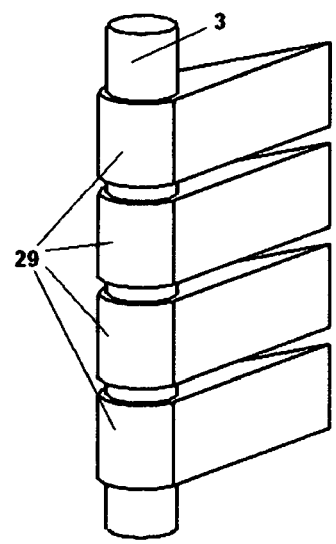

FIG. 18 proposes a solution to reduce the drag of the main cable (3) from the cable group. Wind form drag is minimized by placing streamlined components (29) on the cable (3), that are independent and free to rotate and align themselves naturally with the wind direction. These devices can also be used as wind direction sensors at different altitudes, which may be an important input to the control group.

Figure 19:
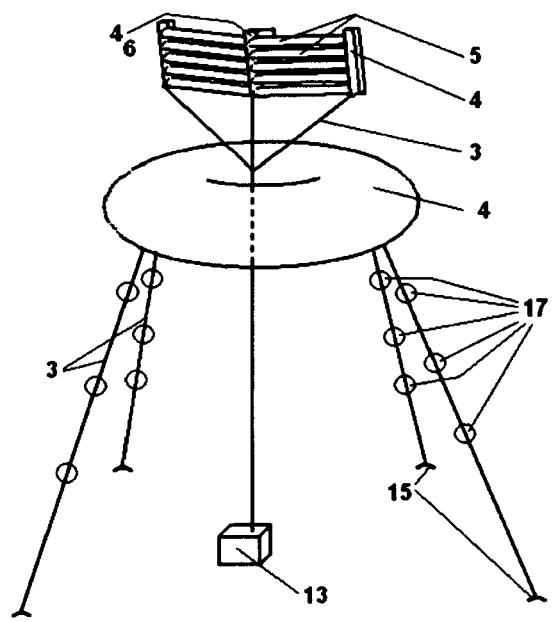
Figure 20:
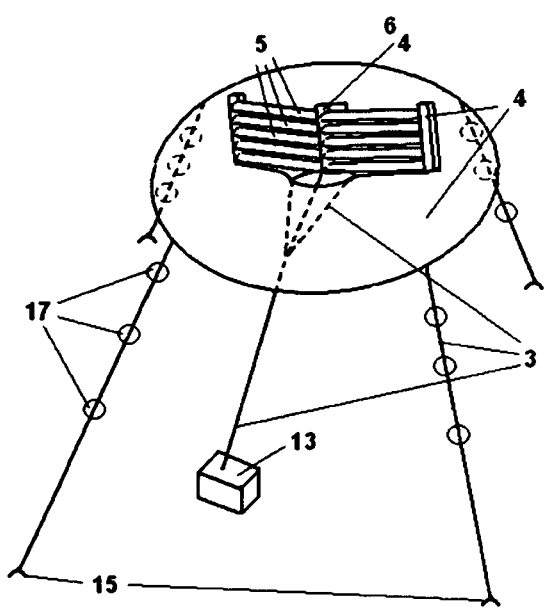

FIGS. 19 and 20 are intended to exemplify another possible embodiment. The buoyancy system (4) includes several elements inflated with lighter-than-air gas, inside a large dimension balloon having enough net buoyancy for itself, the cables (3) and the airborne group. This embodiment solves the problem of the visual reconnaissance elements (17), since the cables including them are not being rewound during the systems periodic movement. At the same time this large dimension balloon is working as a safety base in case of wind absence, for alternatives in which the airborne group might, as a whole, be heavier-than-air. In this later case, should no wind exist, the airborne group will remain stationed in this platform and will not come down any further.

FIG. 20 clearly shows the possibility for the airborne group to land on the buoyancy platform of the buoyancy system (4) which is designed to hold this component should a wind absence situation arise.

Figure 21:
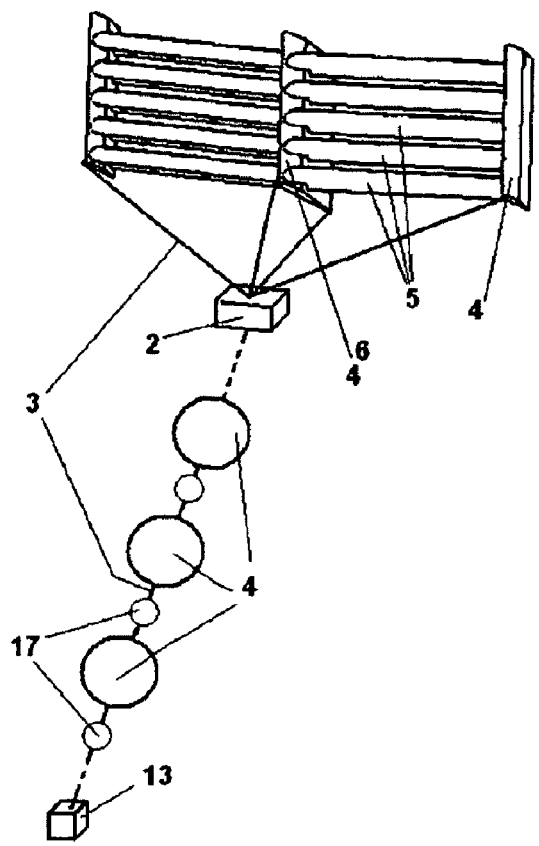

In FIG. 21 buoyancy system balloons (4), destined to provide extra buoyancy to the Cable group are shown. Visual reconnaissance elements (17), such as balloons, are also fitted in the Cable group. In order to be easily identifiable these balloons should have visual distinguishable features (e.g. contrasting colors versus the surrounding environment, sun light reflectors, light emission devices) but may also be equipped with non-visual warning devices, part of the reconnaissance system, such as the emission of unpleasant noises in order to serve as a bird frightening device.

Figure 22:
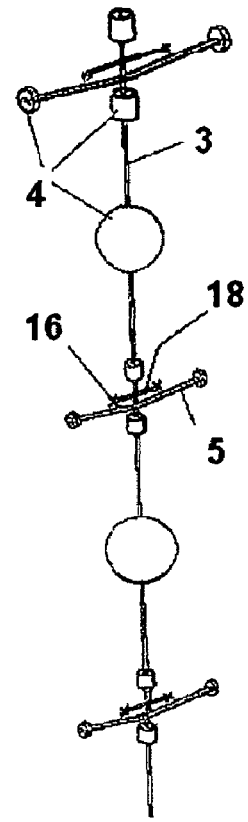
Figure 23:
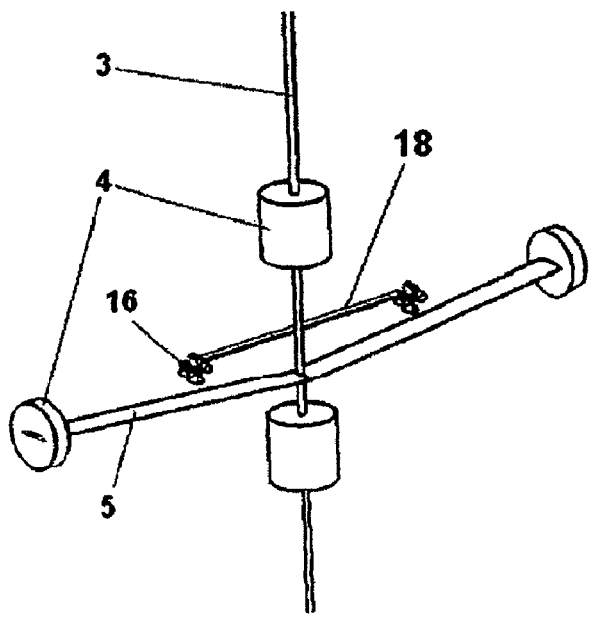

FIGS. 22 and 23 (wherein the later is a zoom-in on the previous one) present an embodiment better suited to act as a high altitude platform which is intended to remain with the payload at a quasi-stationary position. The working principal is the same as explained previously. It is also a modular solution, the main difference being the presence of a propulsion system (16) to improve the positioning of the overall platform against the prevailing wind.

Figure 24:
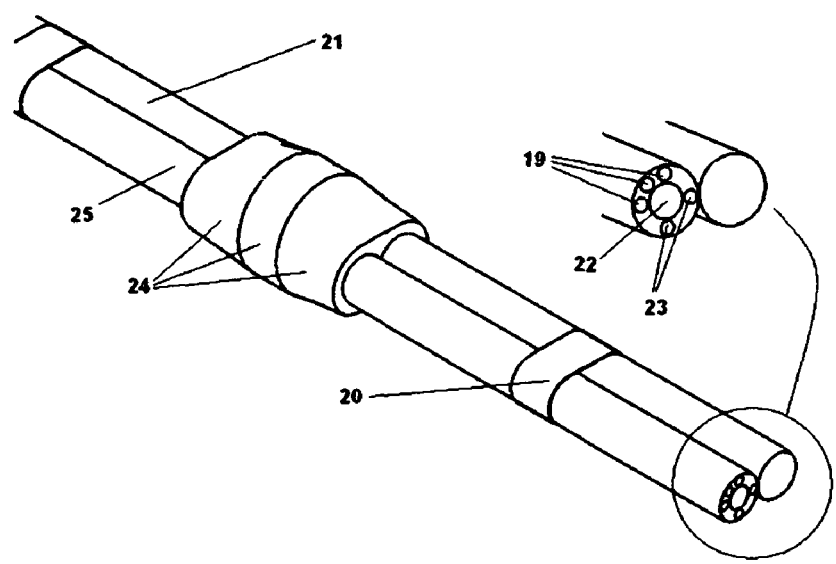

In FIG. 24, a possible Cable group configuration for use in this Atmospheric Resources Explorer is exemplified. The Cable group is inherently complex and multipurpose due to the need to guarantee a connection between the airborne group and the ground station group. The main cable connects the airborne group to the ground station group and is composed of two or more independent cables. The structural cable (21), one of the cables that make up this cabling system, provides for the traction effort caused by the airborne group as it is lifted during the work phase. Attached to this traction cable is another cable (25) which is responsible for providing information exchange between airborne and ground station groups through optical fiber cables (23), for providing lighter-than-air gas from tubing (22) to the buoyancy system and also for providing electrical power to the airborne group using conductive wires (19). Both cables (21 and 25) can be bonded to each other through various tightening elements (20) placed with pre-determined spacing along the length of the cable. Since wind direction changes, if performed consistently in one direction (clockwise or counterclockwise), can impose several turns to the airborne group, this means that knots could be induce on the main cable. In order to avoid this problem one or more cable swivels (24) may be disposed, from the control box down, along the length of the cable group. The cable swivel (24) permits that a torsion imposed on one stretch of the cablings does not have to be imposed on the next stretch of the cables, while still maintaining connection between them, and hence allowing knot formation avoidance, even when facing turbulent winds.

Figure 25:
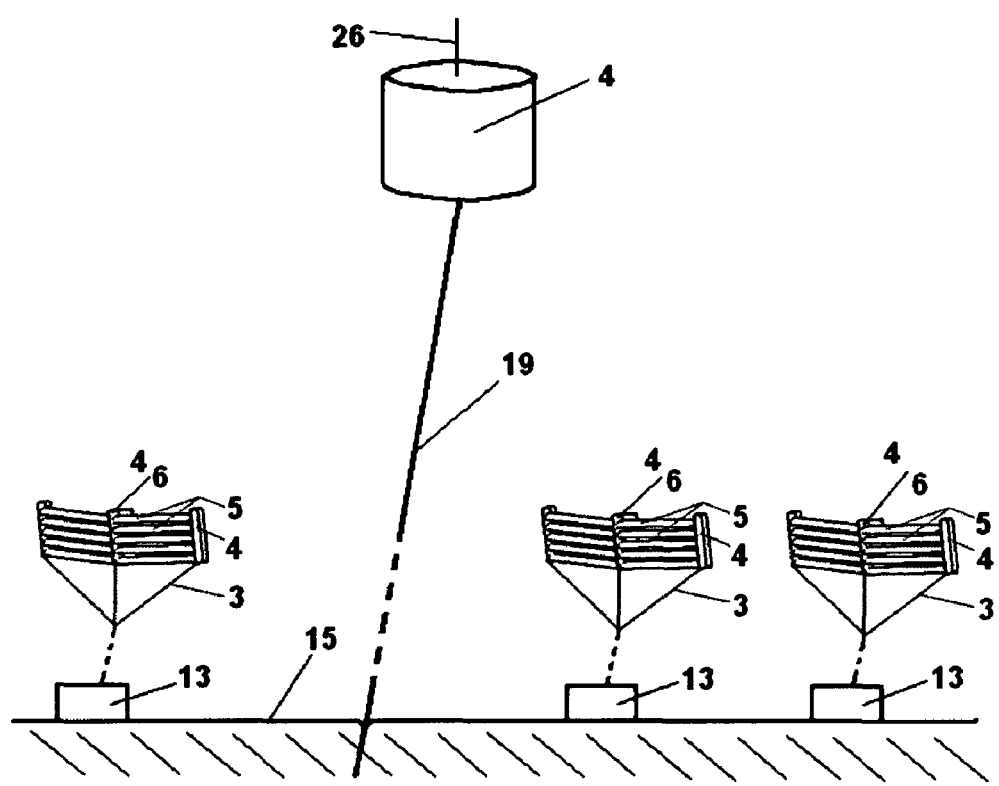
Figure 26:
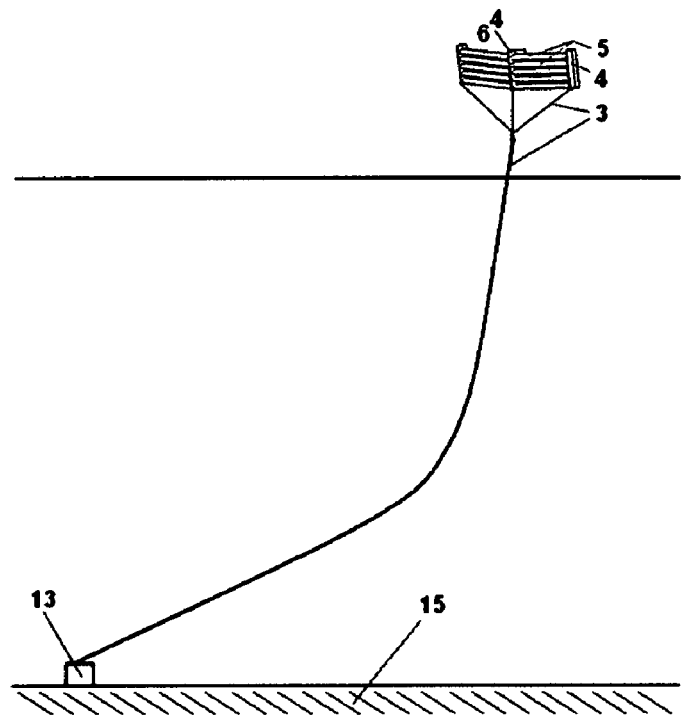

In FIGS. 25 and 26 procedures are exemplified for the case of adverse weather conditions such as cyclonic winds, thunderstorms or tornados, all of which can be hazardous to the system.

FIG. 25 simulates a possible configuration of units in case a thunderstorm should develop, in the area where the Atmospheric Resource Explorer is operating. In order to avoid possible lightning strikes and the subsequent damages, the system is brought down to a safety level. The definition of safety level is provided with the help of an auxiliary system, featuring a lightning arrester component (26) (commonly named lightning rod), connected to the ground through a high current conductive cable (19). This lightning arrester is raised to a much higher altitude than the other airborne groups in the vicinity using at least a balloon filled with either helium or hot air. Thus, the highest grounded object in the neighboring sky would be, by far, this auxiliary system, meaning that all the Atmospheric Resources Explorers composing a wind farm could be considered to be at a safety level.

FIG. 26 simulates the safety procedure in the case of a possible outbreak of cyclonic winds. In order to prevent the destruction of the airborne group it might be required to go up to stratospheric altitudes, where wind conditions remain more stable. In this case, despite the high drag and unfavorable weather conditions imposed on the main cable, it would still be a valid procedure in order to save the airborne group.

Figure 27:
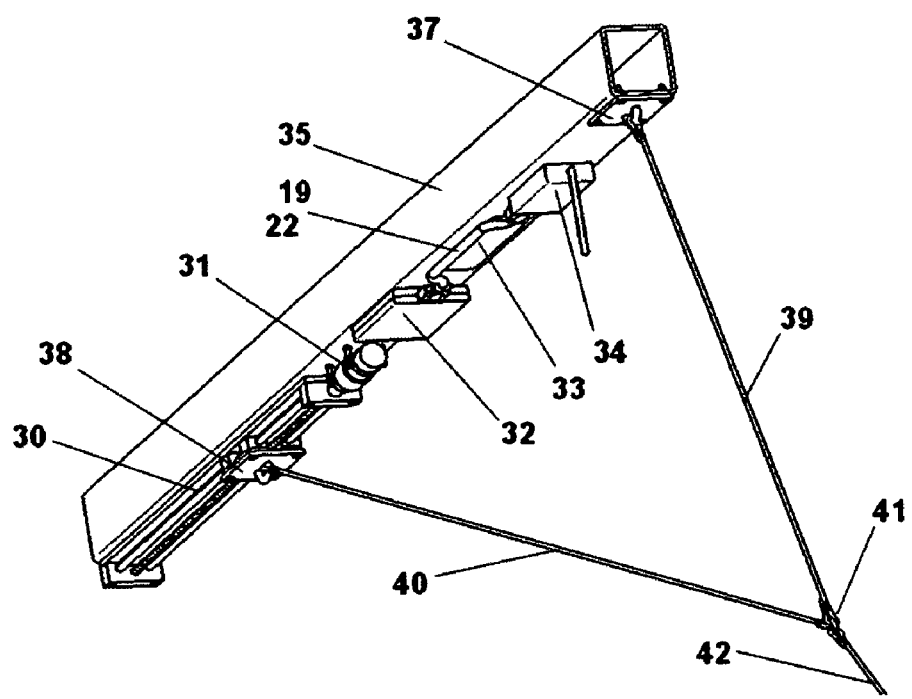

FIG. 27 shows one of the configurations that can be used to control the angle of attack of the aerodynamic system (5). In this configuration the control components are mounted in a support beam (35) that can be placed in the structural system (18) of the airborne group. A wireless connection is established through a wireless transceiver module (34) that exchanges data with the ground station group. The wireless transceiver module is linked to the control board (32) through a data cable (19 and 23). The control board drives the electric motor (31) coupled to the linear table (30) that can change the position of the moving cable anchor (38) pulling or releasing the movable angle of attack control cable (40). The electric components are powered by a battery module (33). The fixed angle of attack control cable (39) is attached to the fixed cable anchor (37) and to the bridle point (41) that joins the control cables to the tether cable (42).

Figure 28:
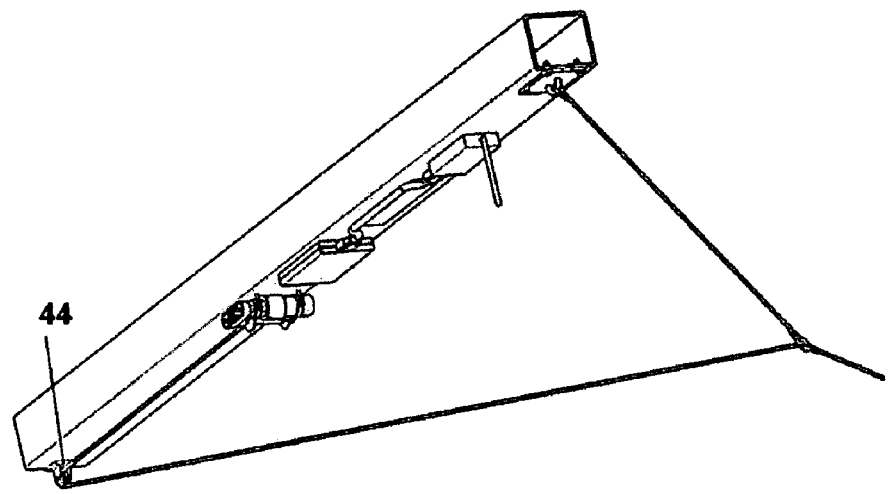

FIG. 28 shows another configuration that can be used to control the angle of attack of the aerodynamic system. The difference between this configuration and the one presented in FIG. 27 is that the moveable angle of attack control cable is pulled or released by using a cable drum coupled to an electric motor (31) instead of a linear table (30). The cable is redirected by a pulley (44) placed in the back end of the support beam (35).

Figure 29:
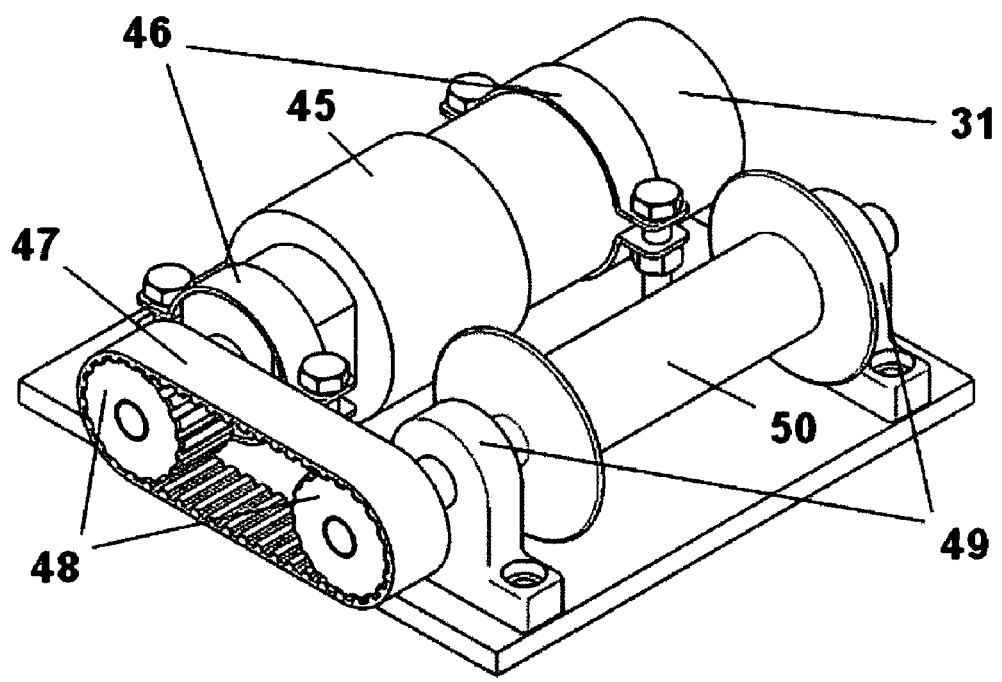

FIG. 29 shows a cable drum (50) driven by an electric motor (31). The electric motor is coupled to a gear head (45), whose shaft is coupled to a toothed belt pulley (48), which transmits power to the cable drum shaft through a toothed belt (47). The electric motor and the gear head are attached to the structural system (18) through two plated brackets (46). The cable drum shaft is supported by two pillow block bearings (49).

INVENTION DESCRIPTION

Introduction

The above detailed invention is capable of harnessing atmospheric wind resources, through an apparatus which transforms wind's momentum into cable tension, that combined with the unwinding from a cable (3) connected to a reeler (7) at the ground station generates mechanical power which can then be converted into electrical power, as is shown in FIG. 1.

In order to perfectly understand the invention description, some definitions are presented in the next few paragraphs.

A system orientation that puts the user at the ground station was followed. Hence, upward is defined as being oriented from the surface to the sky, going away from the user at ground station group. Upward should not be mistaken with vertical, as an upward force must only point to the sky, not straight at it. Conversely, downward is defined as being from the sky to the ground, and is not necessarily vertical or perpendicular to it.

For the purpose of defining modularity, a module is henceforth considered to be each of a set of parts or units that can be used repeatedly to construct a more complex structure.

The Atmospheric Resources Explorer, when producing power, undertakes a periodic motion, performing a cyclic movement or working cycle.

Working Cycle

Whenever the aerodynamic system (further on described in more detail), embodies airfoil components, in order to convert wind power into mechanical power, the control group ensures that the airborne group executes a periodical movement consisting of a work phase, in which the airborne group's attitude is that shown in FIG. 3, and a recovery phase, in which the attitude of the airborne group is that presented in FIG. 4, with work being required by the system to ensure the cable rewinding. For each power and recovery phase the system is said to complete a cycle or period.

During the work phase, work is produced as the airborne group is pulled due to the forces acting on the cable (3) (net buoyancy and aerodynamic forces) and, consequently, the cable connecting the airborne group to the ground station group is being unwound with a specific speed. The combination of the force at the top section of the cable and the unwinding speed is mechanical power and may be converted to electrical power at the ground station group.

As soon as the length of main cable (3) required to perform the cycle has been unwound and, consequently, the airborne group has reached the defined uppermost position, the aerodynamic system parameters will change in order to decrease the upward lift force thus allowing the main cable to be reeled in by the reeler (7), during the recovery phase. During this phase, the airborne group is pulled downwards to return to the position from where it will start a new cycle. During this phase, drag will always work against the system and, should upward forces still exist, either from aerodynamic lift or from net buoyancy, these will also need to be overcome. In order to minimize this effect the control group will act upon the aerodynamic (5) and structural (18) systems of the airborne group changing its aerodynamic parameters regarding the wind in order to reduce aerodynamic lift and, if possible, create enough aerodynamic downforce to cancel out any eventual positive net buoyancy. This will greatly reduce the work required to rewind the cable (3), as only drag needs to be overcome.

As the devised system produces more work, during the work phase than it requires during the recovery phase, net energy will be produced per cycle.

A control mechanism able to extend and recover the tether cable (42) may be used to change the airborne group's attitude in regard to the incoming wind, thus changing its attack angle (FIG. 27). Even though this may seem a preferred solution to execute the transition between the power and recovery phases it is not the sole possibility, and can be accomplished also through other forms, should they prove more efficient.

Aerodynamic System

The airborne group, when incorporating the aerodynamic system (5) and exposed to incoming wind will be subject to two aerodynamic forces:
  lift, perpendicular to the fluid direction approaching the lift generating device,
  and drag, parallel to the fluid's direction;

The resultant vector of both aerodynamic forces, plus the net buoyancy will act upon the system forcing the cable (3) to unwind with a specific velocity which ensures power production at the ground station group. The aerodynamic system might also include one (or more) variable configuration subsystems, wing profiles (5) (also referred to as airfoils) and/or rotating bodies.

A variable configuration element can be interpreted here as:
  a "paraglide-type" structure, able to open during the work phase and close during the recovery phase;
  a parachute, working purely through drag, able to invert its concavity, dependent upon the phase (working or recovery);
  wing profiles (or airfoils) with control surfaces;

The aerodynamic system (5), if equipped with airfoils capable of generating lift, can be controlled in what respects to the change in attitude of the airborne group, by:
  wing profiles, which can rotate in order to achieve a desired angle of attack, independently of the remaining components, in what resembles the process through which blind curtains can dim the light intensity (luminance);
  a system in which it is the structure itself who rotates to acquire the needed angle of attack, and the wing profiles, being solidly attached to this structure, will rotate as well, as exemplified in FIGS. 3 and 4. This can be done through the operation of a cable which is able to change the orientation of the whole assembly;

The aerodynamic system may also comprise rotating bodies which will have increased lift and drag due to the Magnus effect, by changing this rotating speed and its direction a difference between the aerodynamic forces may be achieved between working and recovery phases (FIG. 11). However, in this document, the preferred embodiment used for the aerodynamic system are airfoils and the aerodynamic forces are controlled by changing their angle of attack in regard to the wind.

Structural System

The Airborne group's structural system (18) is composed of elements required to ensure that the deformations occurring, due to the stresses caused by all forces acting upon the airborne group (wind related, buoyancy related or cable related during the rewinding phase), will not jeopardize the system's ability to perform its main tasks. The elements of this system can be rigid, in order to better cope with torsion, bending and flexing moments, and better distribute stress tensions acting upon its surface, in which case they could resemble conventional beams, joints and tubular elements. Other elements of this system may not be so rigid and may include, stitching lines to join pieces of cloth, glue applications to bind cloth to other elements and other mounting or support points. In practice one could say that almost every element has also a function in the structural system.

Buoyancy

The buoyancy system (4) includes all components installed with the sole purpose of decreasing the overall airborne group's density and with the objective of producing positive net buoyancy, by which it is meant here the positive difference between the upward force created by the lighter-than-air gas volume and the weight of all components that must be airborne.

It must be guaranteed that the airborne group will be kept adrift even in an eventual wind absence situation. In order to accomplish such a task, three possible solutions exist:

- To include in the airborne group and/or attach to the cable group components with lighter-than-air gas, with enough volume, in order to guarantee that the airborne group remains in the air even in the absence of wind;
- To install a propulsion system (16) comprising such devices as engines with coupled propellers, turbofan and/or turbojet engines, all of which are capable of inducing air speed into the airborne group and thus providing lift in the absence of wind;
- The installation of an airborne platform which will act as a carrier, as is depicted in FIGS. 19 and 20.

Should hydrogen or any other inflammable substance be chosen as the lighter-than-air gas, and a double layer system may be employed, as a safety measure against possible static discharges, wherein an outer layer, filed with an inert gas, completely surrounds the hydrogen inflated inner layer. The objective of this double layer system is to prevent the contact between the inflammable substance and the atmosphere's oxygen.

With present technology, lighter-than-air gas leakage will undoubtedly occur. The buoyancy system (4) should be provided with means of re-inflating the lighter-than-air components while airborne. One possible process to accomplish this task is to equip the main cable (3) from the cable group with a tubing system through which lighter-than-air gas will reach the airborne group. Nevertheless, in case the tubing system (22) on the cables is either not working or not present in the design, both the buoyancy gas and the inert gas may be obtained directly at the airborne group from equipment installed there. In any case, the in-situ production of the required gas during operation, having the equipment (or devices) installed either in the ground station group or on the airborne group, may be accomplished according to the following schemes:

- The electrolysis of water captured from atmospheric humidity and/or rain is capable of supplying hydrogen to the buoyancy system should this system be equipped with electrochemical equipment, and should the lighter-than-air gas used be hydrogen;
- Since only 21% of the atmospheric air content is non-inert oxygen gas, purging the atmospheric air from its oxygen parasitic content can prove to be a correct strategy to obtain an inert gas, while airborne. This can be achieved through chemical oxidation reactions used to consume the oxygen, freeing the inert gases from the air being processed, or employing sieves and/or membranes which perform the separation essentially by pressure and the difference between molecular radius of oxygen and nitrogen gas.

This buoyancy system (4) may also feature elements that are not attached to the main airborne structural system (18), being attached solely to, for example, the cable group (FIG. 21). The inherent advantage is that the buoyancy achieved is greater at smaller altitudes than at higher ones, since buoyancy is related to the density difference between the inner gas and the surrounding atmospheric air. Because the density of air decreases with altitude so will the above mentioned difference, thus reducing buoyancy. Having buoyancy components scattered along the main cable's length, each buoyancy component could counterweight at least its own weight and that of the cable section immediately below it. One added advantage of this procedure would be that an increase on the cables cross section area and consequent increase of the total cables mass may not be required. The reasoning being that each cable's section must only sustain its own weight (and not the whole structure) back to the surface. Some examples are presented in FIGS. 1, 19, 20 and 21, where buoyant elements (4) also play an important role in the structural part of the airborne group.

Modularity

Amongst the many advantages of this system, when compared to traditional wind turbines, are the modularity and the possibility to operate at higher altitudes, should the desired power output from each system's module not be enough. This is due to the fact that wind's power density increases with altitude (up until the beginning of the stratosphere). While traditional wind turbines rely solely on scalability (but with problems such as the inertia of the current 2 MW systems which do not produce power below 3-4 m/s of wind speed) the system described here is both scalable and modular.

Larger power outputs can be accomplished through the use of multiple smaller modules, joined or stacked up. Larger power outputs can also be accomplished through the building of an Atmospheric Resources Explorer in which all the relevant dimensions are increased and or decreased by a constant value factor. In this case the system is said to be scalable.

Versatility

Being constrained only by the cable connection to the ground station, this system presents an advantage versus competitive power production systems, since all competitive designs present systems that are more constrained in their respective abilities.

The airborne group due to its versatility can operate until the limits of troposphere, where the power density from wind is at its peak. In the stratosphere the wind speed diminishes (as does air density) and as a consequence there's no strong argument to operate in this region except if it is providing a permanently stable stratospheric platform, in which case advantages can be taken from such a location.

Cables

The Cable group comprises at least the main cable (25) (having an example of a possible cross section presented in FIG. 24), which connects the ground station group to the airborne group and may have several other functions then just this structural function just mentioned and which will be further on detailed. The Cable group may also comprise other cables, used to perform the control of the airborne group. These other cables that connect the multiple systems of the airborne group to the control box positioned at the top end of the main cable must include the fixing points to the airborne group, which are positioned in order to ensure optimum spacing in between, thus making sure that no rupture takes place as the wind force acts upon these elements.

It is precisely during the work phase that the airborne group will impose the highest tensioning force on the cables (3) implying considerable efforts upon them. Hence the cables should be made of multiple cablings to ensure good stress distribution. In FIGS. 2 and 5 examples are provided that guarantee near optimum stress distribution amongst the cables in order to diminish or eliminate the possibility of ruptures.

The main cable example presented in FIG. 24 also ensures data exchange between the Airborne and ground station groups, which may be done for instance through fiber-optic cabling (23) or electric conductive wires (19). Additionally these cables (19), or similar cable, may transport electric current to power the propulsion and/or control system which, in case the Magnus effect is being used, for instance, may include engines to rotate some of the components in the aerodynamic system.

Cable swivels (24) are used in the main cable in order to prevent a phenomenon that could otherwise occur, as the airborne group is constantly aligning with the wind and could eventual cause a constant torsion on the cable in a same direction. If no cable swivels were installed, the main cable could succumb to the resulting torsion stresses and develop knots throughout its length impying that after a period it would be almost impossible to unwind and rewind it.

Some aerodynamic attention to the main cable should be paid, as the drag experienced by this cable should not be underestimated especially for the high altitude platform case. The cable does not need to be perfectly circular in its section, but it will be approximately circular, as a squared section cable would prove very difficult to unwind and rewind. Thus, the section will probably be elliptic or circular.

In the cases where a high altitude platform is to be employed, and hence the cable (3) will not need to be reeled in, the length of cable to be deployed will impose both a weight and drag penalty on the system. The drag penalty, which, has said previously is not irrelevant can nevertheless be reduced if streamlined shaped add-ons, such as those shown in FIG. 18, are employed throughout the length of the cable. This enables the existence of two high pressure regions, one at the front and one at the back, meaning that pressure recovery has been achieved and that form drag has been reduced.

Control

Using some or all the systems and devices already mentioned it is the control group's duty to implement a controlling strategy whose main objective is to extract from the wind the pretended amount of power. To achieve this objective the controller (or control group) has to guarantee that the energy produced in the work phase is much higher than the consumed energy in the recovery phase. This means that the net energy production will be the key input for the controller to perform the airborne group positioning control. The position control can be performed by changing the aerodynamic system parameters, namely the angle of attack when using airfoils and, simultaneously, pulling or releasing the tether cable (42) that connects the airborne group to the ground station group, meaning that the angle of attack can be defined by monitoring the power produced by the ground station generator. The angle of attack can be changed by one of the following ways:
  directly from the ground station by using various tether cables (42);
  through an aerial control box that, in its turn, can be placed:
    in the bridle point of the airborne group as presented in FIGS. 3, 4 and 5, or
    in the structural system of the airborne group as presented in FIGS. 27 and 28;
  using control surfaces;

In the first case the angle of attack is controlled by pulling or releasing tether cables (42) from the ground station group. In this configuration all the cables (3) are used to transmit work to the ground station. The data from the airborne group can be transmitted either by wireless module (34), electrical cable (19) or optic fibre (23). In the second case the control box controls the angle of attack by pulling or releasing the angle of attack control cables. If the control box (2) is placed in the bridle point of the airborne group, the cables may be pulled by using actuators such as for example small cable drums (50) that can pull various cables (3) or pull some cables while releasing others. This later option may instead be substituted by physically moving the position of the control box in the cable (going from the control box to the airborne group), it would be similar to using the cable as a rail for the control box. If the control box is placed in the structural system of the airborne group it may use linear tables (30) or small cable drums (50) as shown in FIGS. 27 and 28 respectively. The cable drums and linear tables may in turn be actuated by electric motors (31). In this configuration the power for the motors in the control box can be ensured by electric cables (19) from the ground station group or by any rechargeable electrical system in the airborne group. The data transmission can be done by electric cables (19), optic fibre (23) or a wireless communication system. The control box can include electric motors, cable drums, electronic components, power system, data transmission module and all non-mentioned devices that may be needed to control the orientation of to the airborne group.

Devices used to ensure the airborne's group aerodynamic stability (6) are another important factor to guarantee the airborne group's safety, preventing it from crashing onto the surface (15), with potential damaging consequences to both people and goods. Amongst such systems are vertical (and/or horizontal) stabilizers (6) which, due to their inherent construction, provide added aerodynamic stability as well as improving the buoyancy characteristics of the group. To ensure that the airborne groups are stable the system should be endowed with intrinsic stability characteristics with some similarities with the equilibrium of forces and moments of flying kites. With such an objective in mind the airborne group might include one or multiple tails that can range from simple non-structural parts, such as the ones used in kites, to more complex components.

Since the airborne group position is important for the control and safety operations, it is necessary to guarantee an accurate and reliable measurement of the position. This is further more important because other Atmospheric Resource Explorers might be operating in the vicinity area and their control groups should be able to communicate with each other in order to avoid collisions between neighboring airborne groups. In order to determine the airborne group's position, at least one of the following methods can be employed:
  analytical estimation based on the length of unwind cable (3), the catenary's equation and the applied forces on the airborne group;
  triangulation when using the wireless data transmission;
  satellite navigations systems;
  radars;
  altitude and wind direction meters;
  optical emitters/receivers.

One of these methods is used as the position primary control while all other ensure redundancy to the control system.

The control system is also responsible for the safe operation of all the apparatus, implementing safety procedures when something goes wrong in the system (e.g. a loss of wireless connection) or collision avoidance between airborne groups.

To improve the performance of the controller, the system's dynamic model may be estimated. This model can be obtained by analytical or learning techniques. The analytical solution requires an aerodynamic model of the airborne that is difficult to obtain due to the highly nonlinear behaviour of the system. The application of learning techniques requires the airborne group design to guarantee, a priori, the stability of the system, hence making it possible to launch the airborne group an initial time into the air without any modeling simulation. After this initial launch data will be acquired that, when processed, will supply important insights into the elaboration of a model.

Because the main tether cable (3) is unwound and rewound on the ground station cable drum (7), the electric power and data transfer by cable between the ground station group and the airborne group can be performed by a rotary transformer or slip ring in the cable drum of the ground station group. Since slip rings usually have very short time spans and imposes frictional torque forces on the system, the rotary transformer should prove the best choice. However a solution to avoid the interference of the power transfer on the data transfer might be needed and can possibly be obtained through some kind of isolation or modulation of the data signals.

Alternatively the cable may have a non-rotating end on the ground station in which case the winding has to be done using a conical system similar to the ones used to recoil fishing net cables.

Power supply to the control system is achieved through means of a secondary power system, featuring rechargeable electrical systems such as batteries, capacitors and/or regenerative fuel cells, to name just a few. This secondary power system not only can be recharged from the ground, but may also be recharged, for instance, with photovoltaic generated energy, in case solar panels are mounted in the airborne group, or through wind power, should a small conventional aero-generator be attached to the structural system of the airborne group.

The Control group, if desired, can define the altitude operating interval between working and recovery phase in order to always provide the amount of power that the ground station is able to convert or the power allowed by the licensing contract.

Ground Stations and Capacity Factors

It is at the ground station group that the force with which the cable (3) is pulled upwards, combined with the cable unwinding speed, is transformed into power. This is accomplished through the rotation of the reeler (7) and is a consequence of the force generated at the aerodynamic system (5), plus the action of net buoyancy. It is this rotating movement of the reeler that can be converted into a magnetic field variation, which will then induce an electrical current through Faraday's law. It should be noticed that the reeling system should be large enough to be able to reel in the full cable length (in order to bring the airborne group down) and, in a preferred embodiment, composed of a cable drum with a motored reeling system.

This mechanical power can be used directly, for example connected to the propelling system of a ship, or to a pumping system or to any other system able to use mechanical energy directly.

The ground station group can be used both in land and sea. While in land it can be:
rigidly attached to the surface (15), in which case a winch, without cable guidance, may used or,
used in a system where a cable fairlead component (1), guides the main cable (3) to a reeler (7) with reduced friction, as shown in FIG. 16, or
it can be positioned on top of a base, which is able to rotate in order to optimize its position against the incoming wind.

Seaborne installation has numerous advantages in itself, both versus the installation on land and versus current wind turbine installation off-shore. Presently, the installation of off-shore wind turbines requires very shallow waters, such as those found on Denmark's shore, or in the North Sea. So far wind power harnessing devices have not been installed in deep waters, as the turbine tower would have to be buried in the sea surface, rendering the installation very expensive, due to problems such as sea waves height, tower stresses due to the water pressure, to mention but a few.

On the other hand, the absence of large compressive forces in the Atmospheric Resources Explorer herein described, means that the ground station group may easily be installed on an offshore platform, which for power production may be as simple as a floating vessel anchored to the maritime sea bed or ground. If the apparatus is to be used as a High Altitude Platform, thus imposing traction forces to the ground station group, a more stable solution should be found. Amongst the specific advantages of installing the Atmospheric Resources Explorer in the sea, one can count:
when compared to land installations, the wind speeds at sea tend to be higher and more homogeneous in their pattern;
the area of the earth covered by oceans is much higher than the land surface;
the risk of collision with aircrafts is also minimal since, while on top of the oceans, airplanes tend to fly at very high altitudes;
the visual impact of such a system is much smaller (if not deemed irrelevant).

Should various Atmospheric Resources Explorers be used simultaneously, on a similar arrangement to a wind farm, it might be possible to dispense with some of the electrical equipment at the ground station group by putting them to work on a synchronized phase. This term is used whenever these apparatus perform similar cycles but have a phase decoupling which enables some of them to be performing the work phase while some others are performing the recovery phase. In this case, the flux of power to the system can be smoothed as the positive output of some is countered by the output requirements of some other. Such an operating scheme could dispense with the use of, for instance, an inertia wheel (8) as a means of providing power for the negative part of the cycle.

Safety Procedures

Amongst the tasks given to the Control Group is the deployment of safety procedures. These measurements exist to protect the integrity of the system against the major hazards that might affect it:
Lightening Strikes;
Cyclonic winds;
Giant waves or Sea storms (if operating in the sea).

It is important to notice that these safety procedures exist to ensure that the safety of the craft is augmented, should any of these hazardous conditions exist. Having a double layer construction in which the outer layer (28) is filled with an inert gas, the system already protects itself against other threats.

A lightening strike is probably the worst scenario, as the electrical discharge can reach several hundred thousands Ampere and this could certainly endanger the Atmospheric Resource Explorer. In order to avoid such a situation an auxiliary system, comprised of at least a lighter-than-air balloon (4) linked to a grounded conductor cable (19) ending on a lightening rod (26), is to be lifted into the air should a lightening storm develop. Simultaneously the Atmospheric Resource Explorer(s), operating in that area, should be brought down to an altitude inferior to that of the auxiliary system, making this auxiliary system the highest object in the vicinity sky. As this auxiliary system is purposely built to safely drive such an electrical discharge to the surface (15), it has the highest probability of being hit by any lightening.

Additionally, each Atmospheric Resources Explorer could also include a lightning rod on its top connected to the last section of the structural cable (21) to be rewound, which could be made of a high current conductive material (such as aluminium high cross section flexible cable) that would be pressed against the grounded electric conductive roller fairlead component (1).

Nevertheless, for high power production, the airborne group will have a considerable surface area that exposed to the wind friction could accumulate a considerable static electric charge. This may be prevented if the surface material of the various airborne groups is electrically conductive, which may be ensured through the use of metalized polymer sheets, available in the market.

Alternatively, an embodiment can be devised in which both the airborne and cable groups are even less electric conductive than the atmosphere and so are the most improbable path for any lightning.

Monitoring the weather conditions at a high altitude where atmospheric pressure is at half its sea level value means that significant changes in weather conditions may be predicted with many days of advance, allowing for preventive measures to be taken in due time. The second threat refers to the possible occurrence of cyclonic winds. In order to deal with such a threat two possibilities may arise:
- If feasible the system should be deflated, brought down, folded and stored;
- If storing is not feasible, the airborne group can be ordered to go up into the stratosphere where it will not be subject to the unfavorable weather conditions.

Should a combination of both thunderstorm and cyclonic winds occur, and the best solution is to bring the system down for storage during the bad weather period. In any case, in the presence of cyclonic winds, the auxiliary system described previously for use as an extendable lightening rod (26) should not be deployed.

The third situation, the occurrence of big waves is usually less felt in the open seas than near the shores, since the size of the wave is inversely related to the depth of the waters in which it is traveling. Still, should the system be required to be brought down, remaining afloat over the seas, this will not pose specific problems. Due to its low specific weight it is guaranteed to remain afloat. Remaining connected to the ground station group (which is firmly anchored to the bottom) the airborne group might be able to drift in the water but it will not break connection with the station, as the cable (3) is able to withstand the stresses imposed by the water on the deflated airborne group. As soon as the control group (which is water sealed for maritime use) acknowledges that the storm is over, the order will be given for the system to be refilled with the buoyancy gas, which will put the airborne group to fly again.

Payload and High Altitude Platforms

The system is endowed with potential for use as a high altitude platform, also known as atmospheric or (if high enough) stratospheric platform. In the present invention this platform achieves the pioneering aspect of remaining long-term airborne and stationary.

The structural system (18) may be used as an aerial anchorage or support point, where a payload system (14) can be installed and controlled through appropriate measures from the control group. This payload system has an interface with the cable group and may be understood as a black box (or an empty volume) which is not fundamental to the proper functioning of the Atmospheric Resources Explorer or the interaction between its components. This payload system (14) allows the installation of equipment for both the military and the civilian market with applications as diverse as observation, scientific research, telecommunications and others.

A brief summary of non-exclusive possible applications, for which the payload system is adequate, includes at least:
Terrestrial observation and monitoring:
- Early fire detection and monitoring;
- Weather monitoring high-altitude stations;
- Pollutant concentrations monitoring;

For telecommunications:
- Above the clouds laser satellite up-link;
- Differential correction for GPS use (usually known as DGPS);
- High efficiency beacon installation;
- Internet supply to remote areas where mobile communications are not present;
- Local alternative to geo-stationary satellites;
- Radar installation;

For scientific research:
- Astronomical observations are more accurate since the atmosphere is less dense;
- Possible installation of a drop tower for microgravity simulation;

Install equipment for any application that might benefit from the use of an elevated position;
Electricity production through the airborne installation of a conventional wind generator, the output of which can be transferred via the cable group to the surface (15);
transport goods and/or people to elevated positions somewhere between ground level and the system's maximum altitude.

The Atmospheric Resources Explorer, as previously mentioned, may also be used as means of traction of a system otherwise subject to unstable loading, which then, due to the reduction of the compression forces, acquires the ability to support higher loads without the risk of buckling. The argument stands under the assumption that the ground station group is not used for electricity production (it is instead composed of a system that harness the traction force transmitted by the cables). Such a system can be as simple as a beam, a mast, a bar or a pole, or attain much higher scales such as a building, a bridge pillar or any other current application in structural engineering. Another such application is to use one of these platforms to install cargo lifters in construction works that span high in the sky.

These platforms are extremely attractive for cargo launching into space. Serving as a type of intermediate phase, between ground and orbit, they could prove a very useful device to carry heavy cargos into space. The big advantage is the fact that, being able to hold the payload cargo, the fuel saved due to the fact that the launchers can turn their ignition only when they are already in stratosphere (with the added potential, energy and decreased drag), is by no means irrelevant. Another use, perhaps with an even greater potential is the possibility to use the platform to accelerate, from surface, any type of cargo, for example a sounding rocket, a launcher or a spacecraft. Freed from earth's dense atmosphere, the airborne platform is already animated with speed and altitude, hence being already endowed with both potential and kinetic energy. This energy could be transferred to the cargo without loss of mass, for example, through the use of a payload cabling arrangement. The launch might even benefit if executed inside a tower (or tubing) inside which a rarefied atmosphere can be found and/or a gas with a speed of sound over the surrounding atmospheric air.

High altitude platforms may also be used as tourism attractions through the installation of panoramic sky-lifts, or a type of human environment simulation dome that might render the platform attractive to this new type of tourism.

The invention claimed is:

1. An Atmospheric Resources Explorer, characterized by an airborne group that for using wind power and momentum to maintain a controlled self-sustained flight and cable stress, comprises at least the following:
    a) an airborne group including a buoyancy system comprising inflated components and an aerodynamic system (5) consisting of a combination of the following:
        i) airfoils with a leading edge facing an incoming wind; and
        ii) axially rotating bodies making use of the Magnus effect to create lift force and increased drag;
    b) a control group (2);
    c) a ground station group (13) comprising at least one winch (7) to unwind and rewind a cable, as well as ballast or an anchorage structure (9); and
    d) a cable group (3) which comprises one main tether cable (3), that connects the airborne group to the ground station group (13), as well as an assembly of cables used by the control group (2) to act upon the airborne group.

2. The Atmospheric Resources Explorer according to claim 1, wherein the airborne group comprises:
    a) a payload system;
    b) a buoyancy system (4), comprising gas tight components inflated with a lighter-than-air gas;
    c) a propulsion system (16), comprising reaction engines;
    d) a structural system, comprising all the connectors and anchorages between components;
    e) an aerodynamic system (5) that comprises one or several of the following components:
        i) airfoils to generate aerodynamic lift;
        ii) drag elements to control the position of an aerodynamic pressure center and thus provide a natural aerodynamic stability to the airborne system; and
        iii) bodies with variable axial rotating speed and consequently aerodynamic force variation due to the Magnus effect;
    f) components of the control group (2) that comprise actuators to perform a combination of the following changes:
        i) the pitch angle of the airborne group, by moving the position of the bridle point; and
        ii) the angular velocity of the axially rotating bodies;
    g) visual and/or electronic aeronautic identification elements comprising a combination of:
        i) physical reconnaissance elements identifying, the airborne system; and
        ii) electronic reconnaissance elements, mainly transponders able to supply geographical coordinates and information on the airborne group to other airborne crafts in its vicinity and to air traffic control entities.

3. The Atmospheric Resources Explorer according to claim 2 wherein the buoyancy system (4) comprises at least a double layer arrangement, wherein an inner layer is filled with lighter-than-air gas and an outer layer is filled with an gas inert to combustion.

4. The Atmospheric Resources Explorer according to claim 3 wherein the buoyancy system (4) can be re-inflated through:
    i) water electrolysis from a supplied tank or a tap, or captured from a stream, a river, sea or from condensed atmospheric humidity, after which hydrogen obtained is supplied to the inner volume of the buoyancy system components; and
    ii) nitrogen and/or argon sequestration from atmospheric air, purging its oxygen content, followed by the provision of nitrogen and/or argon to the outer layer of the buoyancy system components.

5. The Atmospheric Resources Explorer according to claim 1 wherein the cable group (3), that comprises one main tether cable, joining the airborne group to the ground station group (13), comprises a combination of the following components:
    a) electrical conductors;
    b) fiber optic cables;
    c) tubes for fluid exchange, essentially to refill the gas in the buoyancy system (4);
    d) structural cablings;
    e) optionally, buoyancy system components (4);
    f) visual reconnaissance elements; and
    g) a cable swivel, to avoid cable twisting.

6. The Atmospheric Resources Explorer according to claim 1, wherein the ground station group (13) comprises a combination of:
    a) a winch (7) to unwind and rewind the cable group (3), consuming energy during a rewinding step and converting wind energy into torque and rotation during a work stage;
    b) equipment for electric power generation;
    c) an energy storage component acting during the work stage that releases the energy in a later stage and, at the same time, smoothes torque transmitted to the winch;
    d) a structural system;
    e) a transmission shaft to transfer torque and rotation between components;
    f) a clutch device which is closed during the work stage, hence transmitting force to the generator, but which can be opened as soon as a recovery phase begins in order to decouple the generator;
    g) a cable roller fairlead to guide the main tether cable to a reeler;
    h) a coupling system, comprising a gearbox, to change operating torque and speed parameters in order to operate in more favorable regimes;
    i) a braking system capable of limiting rotation speed avoiding damage to the rotating system;
    j) an electric current rectifying system;
    k) a component to perform system electrostatic discharge;
    l) anchorages between the ground station group (13) and the cable group (3); and
    m) ballast and/or anchorage equipment capable of compensating the pulling force that can be exerted by the cables on the ground station group (13).

7. The Atmospheric Resources Explorer according to claim 1 wherein the control group (2), when the aerodynamic system (5) is composed of airfoils, the power production cycle is maximized by the following iterative process:
    a) during the working phase, in a time period sample, power generated during that operating period in the cycle is evaluated and an input signal is sent to the control box to modify characteristics of the bridle point for the next sample period, followed by a comparison between power produced in both periods in order to assess in which period the generated power was greater; and
    b) the previous process is repeated with the modification of the anchorage point characteristics in increments pointing to the power conversion increase, until it is monitored a time period in which the referred power decreases or, the maximum nominal power is reached, in which case, the bridle point should maintain the immediately previous position until:
  i) it starts to reach the end of the cable length defined for the cycle; and
  ii) the power generation value is changed;
c) a similar optimization process will be performed for the recovery phase in which the intention is to optimize the ratio between the energy used, to recover the airborne system to the cycle starting position, and the time of the recovery phase in such a way that the average generated power per cycle is maximized;
d) unless the wind conditions change significantly the first cycles will be performed at slightly different attack angles, and bridle point conditions and unwinding speeds, until a maximum net power output per cycle is achieved; and
e) a database is thus constructed for each location and altitude interval in which such a system is operated in order for this iteration process to be speeded up, since the control group (2) will then be able to compare the real output against the expectable output for those conditions and hence reduce the time delay in which the optimization is taking place.

8. The Atmospheric Resources Explorer according to claim 1 wherein the control group (2), when the aerodynamic system (5) is composed of axially rotating bodies, the monitoring and maximization control of the power production cycle is done by:
  a) the rotating bodies (5), which during a work phase are oriented so that their vector of angular velocity is essentially parallel to the ground and perpendicularly to the apparent facing wind, and so, the Magnus effect is maximized, which can be expected to increase the lift and drag, and hence the cable tension as well as the generated power; and
  b) during the recovery phase, the rotation of the bodies is stopped, meaning that both lift and a drag decrease significantly which in turn minimizes the tension on the main tether cable being rewound and whose rewinding velocity is controlled to maximize the average power produced per cycle, with the possibility
  i) to further minimize drag, the aerodynamic system being oriented so that the area facing the apparent wind is that of one single body possible to actuate upon and animate with angular velocity.

9. The Atmospheric Resources Explorer according to claim 1 characterized by a control group (2) that actuates and modifies the aerodynamic system (5) orientation with respect to the incident wind by using the following processes:
  a) changing, by rewinding or unwinding, bridle and knot cables length, responsible for the connection in the bridle point between the main tether cable and the airborne group; and
  b) changing the bridle point position by using an actuator that moves the main tether cable along a control cable that defines the bridle and knot lengths, using it as a sort of rail, and thus, providing an equal increment and decrement of the bridle and knot lengths or vice-versa.

10. The Atmospheric Resources Explorer according to claim 2, wherein a payload system is kept in a stationary position by defining the main tether cable length and controlling wind-induced aerodynamic forces in combination with a propulsion system (16) located in the airborne group, whose energy is supplied from the ground station group (13) through the cable group (3).

11. The Atmospheric Resources Explorer according to claim 1, characterized by the actuation of the control group (2) on a winch of the ground station group (13) defining in a way that defines the cycle operation interval by the main tether cable length trough through a process which in the cases where the produced electric power is below or above the nominal value, a work or recovery phase respectively, of longer period is carried through, until the airborne group is operating on an altitude interval where, due to wind energy density the normal rated power is effectively converted, or that, if, in alternative, it is reached the superior limit authorized by the airspace regulators or inferior for operation security that adapts the duration of the working and recovery cycles to approach a nominal predefined output power while respecting a suitable operation altitude interval.

\* \* \* \* \*